United States Patent [19]

Respaut

[11] Patent Number: 4,868,476

[45] Date of Patent: Sep. 19, 1989

[54] TRANSDUCER WITH INTEGRAL MEMORY

[75] Inventor: James E. Respaut, Hampstead, N.H.

[73] Assignee: Hewlett-Packard Company, Palo Alto, Calif.

[21] Appl. No.: 115,689

[22] Filed: Oct. 30, 1987

[51] Int. Cl.[4] .............................................. G01N 29/00

[52] U.S. Cl. .................................... 318/632; 318/490; 73/618; 73/633

[58] Field of Search ................. 73/587, 597, 599, 607, 73/609, 611, 618, 619, 620, 625, 626, 628–629, 632–634; 128/633, 660; 318/490, 632, 652, 653, 656, 657; 342/185; 367/103, 105; 368/9

[56] References Cited

U.S. PATENT DOCUMENTS

| | | | |
|---|---|---|---|
| 3,854,281 | 12/1974 | Reichert | 368/9 |
| 4,149,419 | 4/1979 | Connell et al. | 73/626 X |
| 4,399,703 | 8/1983 | Matzuk | 128/660 X |
| 4,446,715 | 5/1984 | Bailey | 73/1 R |
| 4,479,388 | 10/1984 | Matzuk | 73/634 |
| 4,517,985 | 5/1985 | Teslawski et al. | 128/660 |
| 4,530,362 | 7/1985 | Hetz | 128/660 |
| 4,628,499 | 12/1986 | Hammett | 318/657 X |
| 4,664,123 | 5/1987 | Iinuma | 128/660 |
| 4,674,515 | 6/1987 | Andou et al. | 128/660 |
| 4,688,576 | 8/1987 | Meyers | 128/660 |

FOREIGN PATENT DOCUMENTS 3116690 11/1982 Fed. Rep. of Germany .

OTHER PUBLICATIONS

John Krieger, "Memory for Transducer System", Electronic Engineering Times, Jun. 13, 1977, pp. 33–34.

*Primary Examiner*—Bentsu Ro
*Attorney, Agent, or Firm*—Frank R. Perillo

[57] ABSTRACT

A memory means is provided which is adapted to be mounted integral with the transducer element used in a transducer system. The memory may store nonlinearity error information or other information concerning errors in the positioning or scan control for the particular transducer, which information may be utilized by the transducer system to compensate for such errors. The memory may also be utilized to store selected information concerning the measured output characteristics of the transducer element which may be utilized by the transducer system to assure that a desired output level is achieved from the transducer element or that the output otherwise is in conformance with that desired. One or more bytes may be provided in the memory which may be utilized to inhibit use of the associated transducer element for particular fields of use or classes of service. The memory element may also store other selected information concerning the particular transducer element, including various operating constants for the element, which information may be utilized by the transducer system to control the operation of the transducer element, to evaluate responses obtained from the transducer, for service, or for other selected purposes. If an erasable memory is used, an area of the memory may also be utilized to store information concerning the operation of the transducer element, such as its duration of use, which information is periodically updated in the memory by the processor.

22 Claims, 2 Drawing Sheets

TRANSDUCER WITH INTEGRAL MEMORY

FIELD OF THE INVENTION

This invention relates to transducers having an integral memory containing selected information concerning the transducer and more particularly to a scanning ultrasonic transducer having an integral memory which stores selected information concerning the transducer which may be utilized in connection with the operation thereof.

BACKGROUND OF THE INVENTION

Transducers, and in particular ultrasonic transducers, are utilized in many applications, such as medical imaging, where high precision is required. Particularly when the transducers are being used for medical imaging, an error in the positioning of the transducer when readings are being taken could lead to a false diagnosis or treatment. FDA regulations also limit the acoustic power output which may be utilized for imaging various areas of the body and various classes of patient such as fetal or infant. Precise control of power output is therefore required, particularly for transducers which are to be used for more than one class of imaging.

Heretofore, control of transducer position to a selected level of precision has been achieved by maintaining high tolerances in the manufacturing process and by carefully testing and hand-adjusting transducer units which do not conform to these tolerances. For example, mechanical scanning transducers typically have a position sensor, the output from which is compared with a reference signal, and the error output from the comparator is utilized to control a servo-motor which moves the transducer through its scan path. Any nonlinearity in the position sensing device can result in false position readings and can also cause slight variations in the sweep speed of the transducer. Even when great care and expense are taken in the manufacturing process and in the hand adjustment of the device, it is impossible to eliminate all nonlinearity from the position sensing mechanism. As a result, such transducers have been relatively expensive while still providing less than ideal operation.

Similarly, the power output characteristics of individual transducer elements may vary slightly with the applied input, making it difficult, even with high manufacturing tolerances, to provide transducers which produce required acoustic power outputs for different classes of service. Again, even at relatively high cost, less than ideal results are achieved.

Since, either because of FDA regulations, or for other reasons, certain transducers may not be suitable for certain classes of service, it would be desirable if a means could be provided to inhibit the use of such transducers for such classes of service. Existing transducers do not generally provide such a capability.

Another problem with existing transducers is that each transducer has various constants and other parameter values which must be known to the system utilizing the transducer in order for the system to properly control the transducer and to properly interpret the results obtained therefrom. Heretofore, the system utilizing the transducer has had to store representative values for each class of transducer which might be utilized with the system and select the appropriate values from an identification of the class of transducer being used with the system at any given time. This information as to the class of transducer being used may either be inputted manually or may be read from a simple data storage element included with the transducer.

This procedure suffers from a number of limitations. First, while the various constants and other values which are stored are substantially uniform for a given class of transducer, there may be substantial variations in these values among individual transducers in the class. Thus, while the stored values may be usable for all transducers of a class, they are not the exact values for the particular transducer being utilized at any given time. Differences between the average stored values and the actual values for the transducer being utilized may result in erroneous outputs in some applications.

Further, over the years that an ultrasonic system is utilized, new classes of transducers will become available, the parameters for which are not initially stored in the system. This necessitates a reprogramming of the system which includes either firmware or software changes for each new transducer or family of transducers which are provided for use with the system. Software media and/or documentation must therefore be provided with each new release of transducer to permit appropriate updating of the systems in which the transducers may be utilized.

Another potential problem with existing transducers is that, to the extent there are any records at all on use of a transducer, such records are normally manually maintained. Since the transducer used in a given system may be varied for varying applications, it may be difficult or impossible to determine the period that a given transducer has actually been used. Thus, there is normally no record of the actual number of hours of use for a given transducer. Such information could be useful in determining when a transducer should be replaced, when preventive maintenance should be performed, or for other service or related purposes. Such information would also permit service histories on transducers or classes of transducers to be developed which could be used for various purposes.

Finally, no current mechanism exists for informing the ultrasonic or other transducer system on the full range of operating parameters for a given transducer, such as its type, model number, serial number, and various advertised and actual characteristics such as frequency, maximum scan angle, focal distance and the like.

It is therefore an object of this invention to provide a relatively simple and inexpensive mechanism for use in transducer systems for assuring positional accuracy, uniform scan rate and proper power output from the transducer element while at the same time reducing manufacturing tolerances for the transducer.

A more specific object of this invention is to provide an ultrasonic transducer system which is capable of compensating for nonlinearity in the position sensing mechanism so as to permit accurate positioning of the transducer element and a uniform scan rate for the element.

Another object of this invention is to provide a mechanism for providing to a transducer system accurate information concerning the operating characteristics and constants of the transducer being utilized in the system without requiring any reprogramming of the system.

Still another object of this invention is to provide a simple mechanism for keeping track of such things as the age of a transducer element, the actual period of use for the transducer, the period of use for various classes of service, the period of use since last maintenance, and the like.

SUMMARY OF THE INVENTION

In accordance with the above, this invention provides a mechanism for compensating for errors in scanning of a transducer element used in a servo-controlled scanning transducer system. The mechanism includes a memory means for storing correcting information for the errors, and a means for mounting the memory means integral with the transducer element. The correcting information stored in the memory means is used to modify the output from the transducer element scanning control mechanism to compensate for errors. More particularly, the memory means may store measured nonlinearity errors for a position sensing mechanism utilized as part of the servo-control for the transducer. The error information stored in the memory means may be utilized to modify positions stored in a position table which table is utilized to control the point at which readings or other actions are taken by the transducer. For example, the able could control the points at which ultrasonic lines are generated. The stored error information can also be used to modify the reference signal utilized to control the servo-movement of the transducer element, thus providing for a substantially uniform scan rate of such element.

Preferably, the memory means is mounted integral with the transducer element. For a preferred embodiment, the transducer element is mounted in a head which is connected through a cable to a connector which connects to the remainder of the transducer system. The memory means is mounted in the connector.

The memory means may also store an indication of a selected output signal characteristic, such as the output signal power, from the transducer element for selected conditions, the system including means for utilizing the output signal characteristic indications stored in the memory means to control the selected output signal characteristic from the transducer element. The memory means may also include a field-of-use control indication, the system having a means responsive to the field of use control indication for limiting the fields of use for the transducer.

The memory means may be at least selectively erasable and means may be provided for storing in the memory means selected information concerning the operation of the transducer element such as for example the duration of service thereof. Various other selected information concerning the transducer such as, for example, various operating constants, may also be stored in the memory means which is mounted with the transducer element.

The foregoing and other objects, features and advantages of the invention will be apparent from the following more particular description of a preferred embodiment of the invention as illustrated in the accompanying drawings.

IN THE DRAWINGS

DETAILED DESCRIPTION

Figure 1:
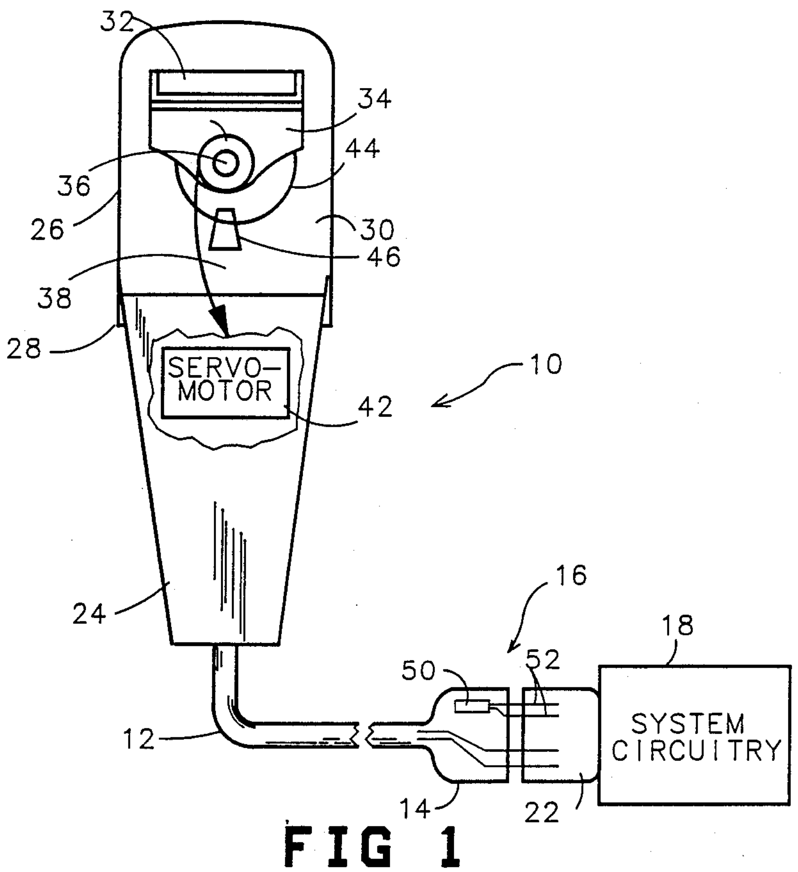
FIG. 1 is a semi-schematic partially cut-away view of a transducer system of a preferred embodiment of the invention.

FIG. 1 is a semi-schematic representation of a scanning mechanical ultrasonic transducer system utilizing the teachings of this invention. The transducer system includes a transducer head 1O, a cable 12 leading from head 10 to the plug 14 of a connector 16 and system circuitry 18 connected to the socket 22 of connector 16. Head 10 has a main body or casing 24 to the top of which is secured a transparent cover 26. In the figure, cover 26 is shown secured to body 24 by screw joint 28. The sealed cavity 30 formed within cover 26 is normally filled with an acoustic coupling fluid having an acoustic impedance substantially matching that of the object being imaged.

Mounted within the cavity 30 is a transducer element 32 which is adapted to alternately generate and receive ultrasonic acoustic signals. Element 32 is attached to a base 34 which is mounted in the cavity to be pivoted about shaft 36. A flexible member such as a spring, wire or cord 38 wraps at one end around a pulley 40 attached to base 34 and is attached to the pulley. The other end of member 38 is attached to servo-motor 42 which is mounted in casing 24. Movement of motor 42 is transmitted through member 38 to rotate base 34 and transducer element 32 mounted thereto in one direction, and to control the return of these elements in the opposite direction.

A vane or fin 44 is attached to the underside of base 34, the vane being wider on one side than on the other and varying in width (radius) between the two ends in a predetermined manner (such as, for example, a section of a spiral). Vane 44 travels through a slot in a toroidal inductor 46 causing predetermined variations in the inductance thereof which varies as a function of the angular position of transducer element 32. Ideally, the inductance of inductor 46 varies linearly with the angular position of the transducer element. However, as has been previously discussed, this objective is not easily achievable and the output from the toroidal inductor is therefore generally, at least to some degree, nonlinear.

Positioned in connector plug 14 is a memory device 50. This may be a programmable read-only memory (PROM) but is preferably an erasable PROM (EPROM). For a preferred embodiment, memory device 50 is an electrically erasable PROM (EEPROM). An EEPROM may be digitally addressed and accessed in the same manner as a random access memory and may have information erased and rewritten in any and all of its memory locations. Memory 50 is electrically connected by for example pins 52 to system circuitry 18.

Figure 2:
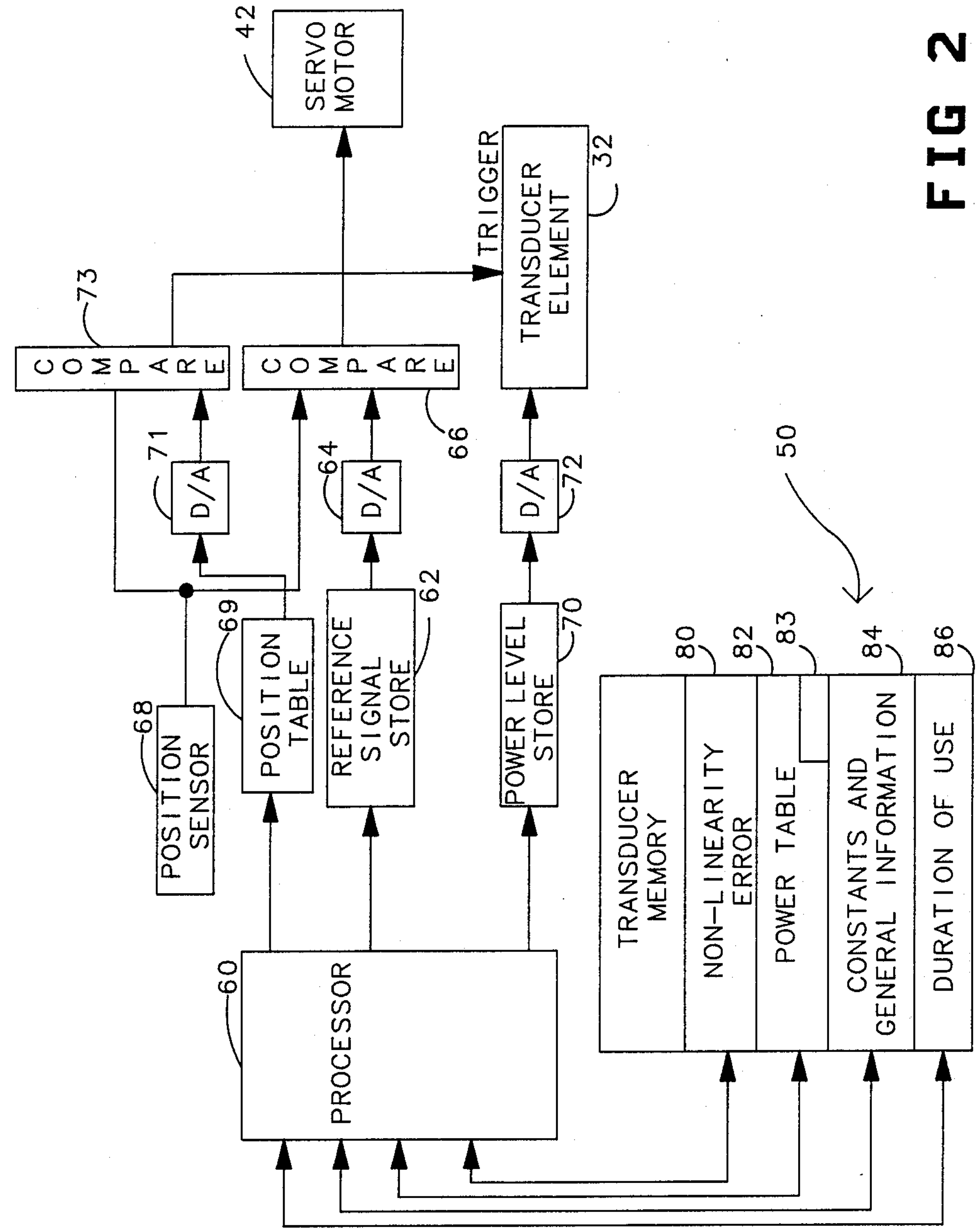
FIG. 2 is a schematic diagram of a transducer system of this invention.

FIG. 2 is a general schematic diagram of the system of this invention. Included as part of system circuitry 18 is a processor 60 which may, for simpler applications, be a standard microprocessor. For more complex applications, the processor 60 may be a minicomputer. Processor 60 receives certain information which will be described in greater detail hereinafter from memory device 50 and utilizes such information in conjunction with other information applied thereto to control, among other things, the scanning of and output power from transducer element 32. In particular, processor 60 generates the reference signal to be used for control of servo-motor 42 and stores a digital representation of such signal in reference signal store 62. This information is periodically read out and applied through digital to analog converter 64 as one input to comparator 66. The other input to comparator 66 is the output from position sensor 68. Position sensor 68 includes inductor 46 and vane 44, the output being from inductor 46. The output from comparator 66, which ay, for example, be part of system circuitry 18, is a voltage which is proportional to the difference between the actual position of transducer element 32 and the desired rotational position of this element. This signal is applied to control servo-motor 42. The elements 62–68 and 42 operate in a standard manner to cause transducer element 32 to be rocked back and forth about pivot 36 at a frequency and otherwise in accordance with the reference signal stored in reference signal store 62.

Similarly, processor 60 generates and stores in position store 69 a table of voltage values from position sensor 68 which correspond to transducer positions in its scan path at which readings or other desired actions are to be taken. This information is periodically read out and applied through D/A converter 71 as one input to comparator 73. The other input to comparator 73 is the output from position sensor 68. The output from comparator 73 is applied to trigger transducer element 32. Except as hereinafter discussed, the nature and operation of this triggering circuit is also conventional.

Processor 60 also determines the power level output from transducer 32 and stores a digital indication of the desired power level in power level store 70. The output from power level store 70 is applied through digital to analog convertor 72 to control the power level output from transducer element 32.

Memory 50 may have a number of different storage areas. While separate lines have been shown leading from each storage area to processor 60, it should be understood that the memory 50 may be addressed from the processor and the output from all areas thereof applied through a common output bus. For purposes of illustration, memory 50 is shown as having an area 80 which stores information concerning nonlinearity errors in position sensor 68, an area 82 which stores power tables used for controlling the power output of transducer 32, and an area 84 for storing general information concerning the transducer such as its type, model number, serial number, advertised and actual measured operating frequencies, advertised and actual focal distance and the like. Area 82 may contain a field-of-use or class-of-use control byte 83 which may be used to inhibit the transducer from being used for selected uses for which it is not suitable. Area 84 may also store certain constants used in connection with operating the transducer and interpreting the results thereof. While the areas 80–84 of memory 50 may be stored in an EEPROM, it is contemplated that the information in these areas of memory would be read only.

Finally, memory 50 has an area 86 which stores various information concerning the duration of use of the transducer, such as total hours of actual use, hours of use since last maintenance, hours of use for various classes of service, or the like. Entries in this area of memory would be periodically erased and rewritten as the transducer is used. Various other information may also be recorded in this area of memory.

OPERATION

As previously indicated, ideally, the output from position sensor 68 varies as a direct linear function of the angular position of transducer element 32. This is illustrated by line 100 in FIG. 3 which shows the voltage increasing linearly as inductance is reduced as a result of element 32 being moved through, for example, an angle of 60 degrees in a counterclockwise direction from its extreme position facing to the right of center as shown in FIG. 1 to the extreme position facing to the left of center as seen in this figure. However, due to nonlinearities in the position sensor device, the actual output from the position sensor may in fact vary nonlinearly as shown for example by the line 102. It should be emphasized that the line 102 is shown for purposes of illustration only and the nonlinearity may take any form. For example, the nonlinearity may all be in one direction, the actual curve may follow the ideal curve for some portion of the scan path, and there may be one or more crossovers which occur at any point along the scan path. Regardless of the form the nonlinearity takes, if, for example, it is desired that readings or other action be taken at the points A–I along the path of travel of transducer element 32, the nonlinearity in the position indication from sensor 68 may cause one or more of these readings to be taken at the wrong point in the scan path and may result in uneven spacing between successive readings. Thus, for example, processor 60 would cause the reading at point C in the scan path to occur when the voltage level from position sensor 68 is at level X. However, due to the nonlinearity in the output from the position sensor, it is seen that voltage X is achieved on line 102 when the transducer element is in fact at point C′ in its scan path, C′ being a point in the scan path somewhat earlier than the point C. Taking a reading at this point in the scan path would thus cause the results from the ultrasonic imaging to be at best distorted and at worst erroneous.

In accordance with the teachings of this invention, as part of a final step in the assembly of the transducer consisting of head 10, cable 12 and plug 14, the actual output from position sensor 68 at selected points in the scan path, for example at every half degree of rotation through the scan path, is measured and the actual or incremental deviation of this value from the desired value, represented by the line 100, at that point in the scan path is stored in area 80 of memory 50. As previously discussed, processor 60 initially stores a table with the voltage values from position sensor 68 at which each reading or other desired action is to be taken in position table store 69. When plug 14 is mated with socket 22, processor 60 reads the contents of area 80 of the memory 50 for the transducer and utilizes the deviation value stored for each point in the scan path at which a reading is to be taken to modify the voltage value in the table in store 69 for that point so that readings in fact occur at precisely the right positions in the scan path for the transducer being utilized. Thus, at the point C, the deviation (d) would be added to the value X stored in the table so that for this transducer, the reading at position C would occur when the output from position sensor 68 was equal to a voltage of (X+d). The system is thus able to use position sensors with lower tolerances while still achieving a very high level of linearity in the operation of the system.

From FIG. 2, it is seen that the output of position sensor 68 is also utilized to control the movement of servo-motor 42. Thus, the nonlinearity in the output of position sensor 68 can also cause nonlinearities in the movement of the servo-motor resulting in the scan rate of transducer element 32 being non-uniform and in uneven spacing between the points, such as the points A–I, where readings or other action is taken.

In accordance with the teachings of this invention, the above problem is dealt with by modifying the reference signal stored in store 62 in a manner equal and opposite from that of the nonlinearity in the position signal from sensor 68.

Figure 3:
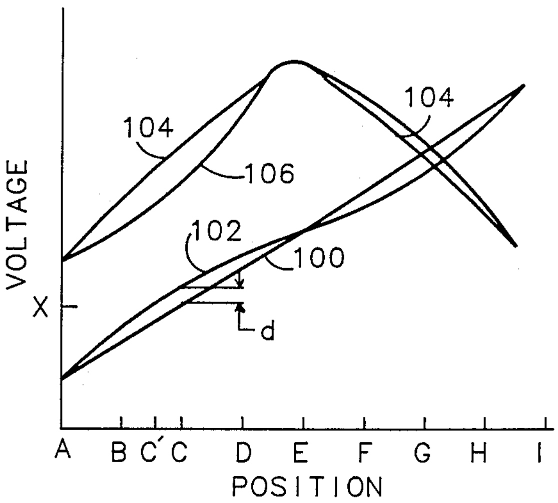
FIG. 3 is a diagram illustrating ideal and actual voltages at various points in the circuit of FIG. 2.

More specifically, referring to FIG. 3, the reference signal for the sweep in one direction may, for example, have the shape of curve 104 in FIG. 3. In order to compensate for the nonlinearity in the position signal from sensor 68, processor 60 utilizes the deviation information in area 80 of memory 50 to modify the reference signal stored in store 62 to, for example, the reference signal 106 shown in FIG. 3 so that the inputs to comparator 66 result in uniform drive signals to servo-motor 42.

As previously indicated, the output audio power from transducer element 32 will vary slightly from transducer element to transducer element for a given potential input to the transducer from converter 72. Since the output power from the transducer for various classes of service is tightly controlled by the FDA, and in order to avoid potential harm to a patient, it is important that the actual output power correspond very closely to the desired output power. Transducers in the past have frequently operated below optimum power to avoid any possibility of excessive output from a given transducer element.

In accordance with the teachings of this invention, the actual power output from the transducer element 32 used in a given transducer is measured for selected inputs at a final stage in the manufacture or testing of the transducer and this information is stored as a power table in area 82 of memory 50 for the transducer. When the transducer is connected to system circuitry 18, processor 60 reads the information from the power table for the transducer into its own memory and utilizes that information to store the appropriate power level value in store 70 for a desired power level output from transducer 32.

If a particular transducer is not designed for particular modes of use or classes of service, byte 83 in area 82 may be appropriately set. This byte is detected by processor 60 and utilized by the processor to inhibit the use of the transducer for the prohibited classes of service. For example, if the transducer is not suitable for use for fetal scanning, the byte 83 would indicate that this class of service was prohibited and would be stored in an appropriate location in processor 60. If the processor was advised that the system was to be used for fetal scanning, it would check the contents of this byte in its memory and if the byte indicated that such scanning was not permitted for the transducer, the processor would inhibit the use of the system for such scanning, until the transducer was replaced.

At the same time that the information in areas 80 and 82 of memory 50 are read into the memory of processor 60, the various items of general information and constants stored in area 84 of the memory would also be read into processor 60. These values would be used by the processor as appropriate in operating the system or in interpreting the results thereof. They might also be used for service or other purposes. The values stored and used are in each instance the correct values for the particular transducer being utilized. Further, this information is available to the system for new classes of transducers or even an experimental transducer which is to be used with the system without requiring that the system be reprogrammed as each new class of transducer comes on the market. It is therefore much quicker and easier to introduce new types of transducers.

Finally, area 86 of the memory is adapted to store selected information concerning the operation of the transducer. The information which is initially stored in this area of memory 50, which may initially be completely blank, is read into an appropriate area in the memory of processor 60. This information is then updated by the processor to reflect operation of the transducer and is periodically written into the appropriate position in area 86. For example, processor 60 may maintain a running tally of the duration of use of the transducer and may read the current setting of this tally into the appropriate location in area 86 at the end of each session, or at other selected times. In any event, such information would be read into memory 50 before the units were turned off so that connector 16 could be open, thereby assuring that if the transducer is disconnected from the system circuitry 18, area 86 of memory 50 will contain current information concerning the operation and use of the transducer.

While in the discussion above, the invention has been shown utilized in connection with a mechanical ultrasonic scanning transducer, it is apparent that the principles of this invention could be utilized with phased array ultrasonic transducers or with other transducers which require precision of scan location or output and where the controls for positioning and/or output may vary from unit to unit. It may also be used in transducer applications when there is a need to keep a running tally of some aspect of the operation or use of the transducer.

Further, while for the preferred embodiment, memory 50 has been shown located in plug 14 of connector 16, it is apparent that the memory device 50 could be located at any appropriate location in the transducer assembly consisting of head 10, cable 12 and plug 14. Factors in selecting the location are available space, ability to make connections and length of connection. Thus, while the memory device must be mounted integrally with transducer element 32, the precise location in the transducer assembly where it is located is not critical.

In addition, while memory 50 has been shown as having areas 80–86 for the preferred embodiment, the memory 50 used for a particular application might have any one or more of these areas or might have one or more areas storing different information as required for the application.

Further, while for the preferred embodiment the error being compensated for was a nonlinearity in the position sensing device used with the servo-motor, it is apparent that the teachings of this invention could be utilized to compensate for any measurable error which might arise in the mechanism for controlling the movement or scan position of the transducer, including, but by no means limited to a nonlinearity in the sensor itself, or the like. Similarly, while, for the preferred embodiment, it is the power output of the transducer element which is being controlled, the teachings of this invention could also be utilized to compensate for variations among transducer elements in some other characteristic or aspect of the transducer output such as, for example, frequency.

Therefore, while the invention has been particularly shown and described above with reference to a preferred embodiment, the foregoing and other changes in form and detail may be made therein by one skilled in the art without departing from the spirit and scope of the invention.

What is claimed is:

1. A servo-controlled scanning transducer system of the type having a transducer including a transducer element to be scanned, means for sensing the position of the element in its scan path and means responsive to the position sensed by said sensing means for controlling the movement of said element, a means for compensating for errors in transducer element scanning, comprising:

memory means for storing correcting information for said errors; and means for mounting the memory means integral with the transducer element;

said means for controlling including means for generating a reference signal, means for comparing the position of the transducer element sensed by said position sensing means at a point in time with the reference signal for the corresponding point in time, drive means responsive to a difference output from the means for comparing for controlling the scanning of the transducer element, and means for utilizing the correcting information stored in said memory means to warp the reference signal in a manner to permit a substantially uniform scan speed for said transducer element.

2. A system as claimed in claim 1 wherein said transducer is a scanning ultrasonic transducer.

3. A system as claimed in claim 1 wherein said transducer included a head containing said transducer element, an electrical connector for connecting the transducer element into said system and a cable connecting said head and connector; and wherein said means for mounting includes means for mounting the memory means in the electrical connector.

4. A system as claimed in claim 1 wherein said transducer element generates an output signal as it is scanned;

wherein said memory means stores an indication of a selected output signal characteristic from said transducer element for selected conditions; and including means for utilizing the output signal characteristic indications stored in said memory means to control the selected output signal characteristic from said transducer element.

5. A system as claimed in claim 4 wherein the selected output signal characteristic is output power.

6. A system as claimed in claim 4 including a field-of-use control indication stored in said memory means; and means responsive to the field of use control indication for limiting the fields of use for the transducer element.

7. A system as claimed in claim 1 wherein said memory means is at least selectively erasable; and including means for storing in said memory means selected information concerning operation of the transducer element.

8. A system as claimed in claim 7 wherein said means for storing includes means for storing information concerning duration of service for said transducer element.

9. A system as claimed in claim 1 wherein said memory means also stores selected additional information concerning said transducer element.

10. A system as claimed in claim 9 wherein said additional information includes various operating constants for said transducer element.

11. A system as claimed in claim 1 wherein the errors in transducer element scanning are caused by the position sensing means for the transducer element which sensing means has nonlinearity errors;

including means for storing a table of selected positions in said scan path at which selected actions are to be taken with respect to the transducer element;

means for utilizing said table to control where in the scan path the selected actions are taken; and means for utilizing the stored correcting information to modify positions stored in the table so that actions are taken at uniform intervals.

12. A system as claimed in claim 11 wherein the action to be taken is the energizing of said transducer to generate an output.

13. A transducer system having a transducer element adapted to generate a scanning output signal, a means for controlling the output power of said scanning output signal, comprising:

memory means for storing an indication of the output power characteristic from said transducer element for selected driving signals applied thereto;

means for mounting the memory means integral with the transducer element; and means for utilizing the output power characteristic indication stored in said memory means to control the output power of the scanning output signal from said transducer element.

14. A system as claimed in claim 13 including a field of use control indication stored in said memory means; and means responsive to the field of use control indication for limiting the fields of use for the transducer element.

15. A system as claimed in claim 13 wherein said transducer element is an ultrasonic transducer; and wherein said power characteristic indication is a power table indicating the ultrasonic power output from the transducer element for at least selected settings of the transducer system.

16. A transducer system having a servo-controlled scanning transducer element, a means for providing selected current information concerning the operation of the transducer element, comprising:

memory means for storing the selected information concerning the transducer element, said memory means being a read-write memory at least in the area thereof in which said selected information is stored;

means for mounting the memory means integral with the transducer element; and means responsive to the operation of the transducer element for periodically updating the selected information stored therein to keep such information current.

17. A system as claimed in claim 16 wherein said selected information is information concerning duration of service for said transducer element.

18. In a servo-controlled scanning transducer system of the type having a transducer element to be scanned, the transducer system including at least one element adapted for use in controlling the scanning of the transducer element which one element has a measurable error characteristic, a method for compensating for errors in transducer element scanning comprising the steps of:

storing integral with the transducer element correcting information for said error characteristic;

generating a reference signal;

continuously sensing the position of the transducer element;

comparing the position sensed for the transducer element at a point in time with the reference signal for the corresponding point in time;

utilizing the difference in output from the comparing step to control the scanning of the transducer element;

reading the stored correcting information; and utilizing the stored correcting information to warp the reference signal in a manner to permit a substantially uniform scan speed for the transducer element.

19. A method as claimed in claim 18 wherein the element having the error characteristic is a position sensor for the transducer element which sensor has nonlinearity errors; and including the steps of performing selected actions with respect to the transducer element at selected positions in the scanning of the element;

storing a table of selected positions in said element scanning, utilizing said table to control where in the scanning of the element said selected actions are taken;

and utilizing the stored correcting information to modify positions stored in the table.

20. In a transducer system having a scanning transducer element adapted to generate a scanning output signal, a method for controlling the output power of the scanning output signal comprising the steps of:

storing integral with the transducer element an indication of the output power characteristic for the transducer element for selected driving signals applied thereto; and utilizing the stored output power characteristic indication to control the output signal power of the scanning output signal from the transducer element.

21. In a transducer system having a servo-controlled scanning transducer element, a method for providing current selected information concerning the operation of the transducer element comprising the steps of:

storing the selected information concerning the operation of the transducer element in a read-write memory means mounted integral with the transducer element; and selectively updating the selected information stored in the memory means in response to the operation of the transducer element to keep such information current.

22. A method as claimed in claim 21 wherein the selected information stored in the memory means is information concerning the duration of service of the transducer element.

* * * * *